Figure 1:
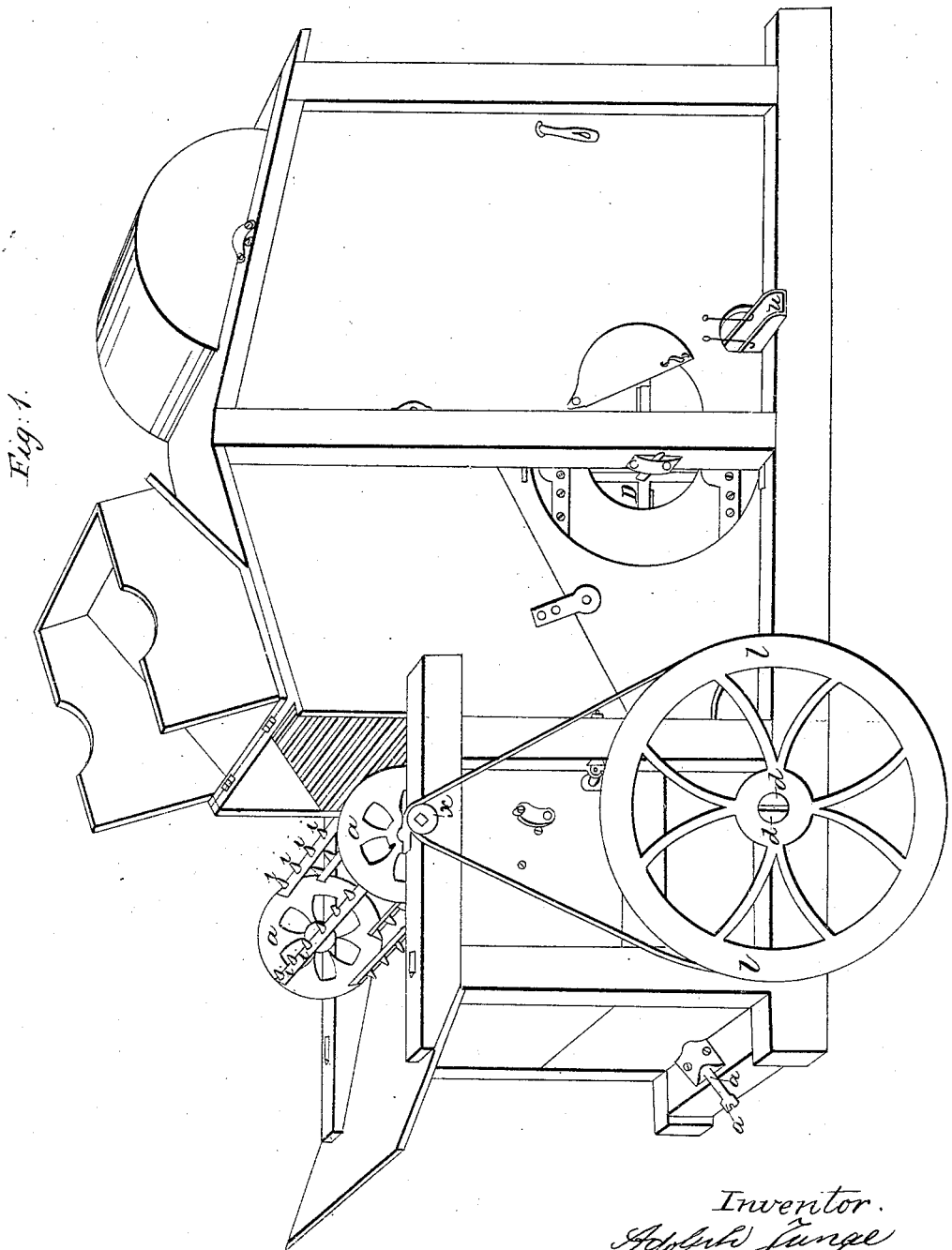

A. JUNGE.
Thrashing Machine.

No. 18,455.

3 Sheets—Sheet 1.

Patented Oct. 20, 1857.

A. JUNGE.
Thrashing Machine.

No. 18,455.

3 Sheets—Sheet 2.

Patented Oct. 20, 1857.

Inventor.
Adolph Junge

A. JUNGE.
Thrashing Machine.
No. 18,455.
3 Sheets—Sheet 3.
Patented Oct. 20, 1857.
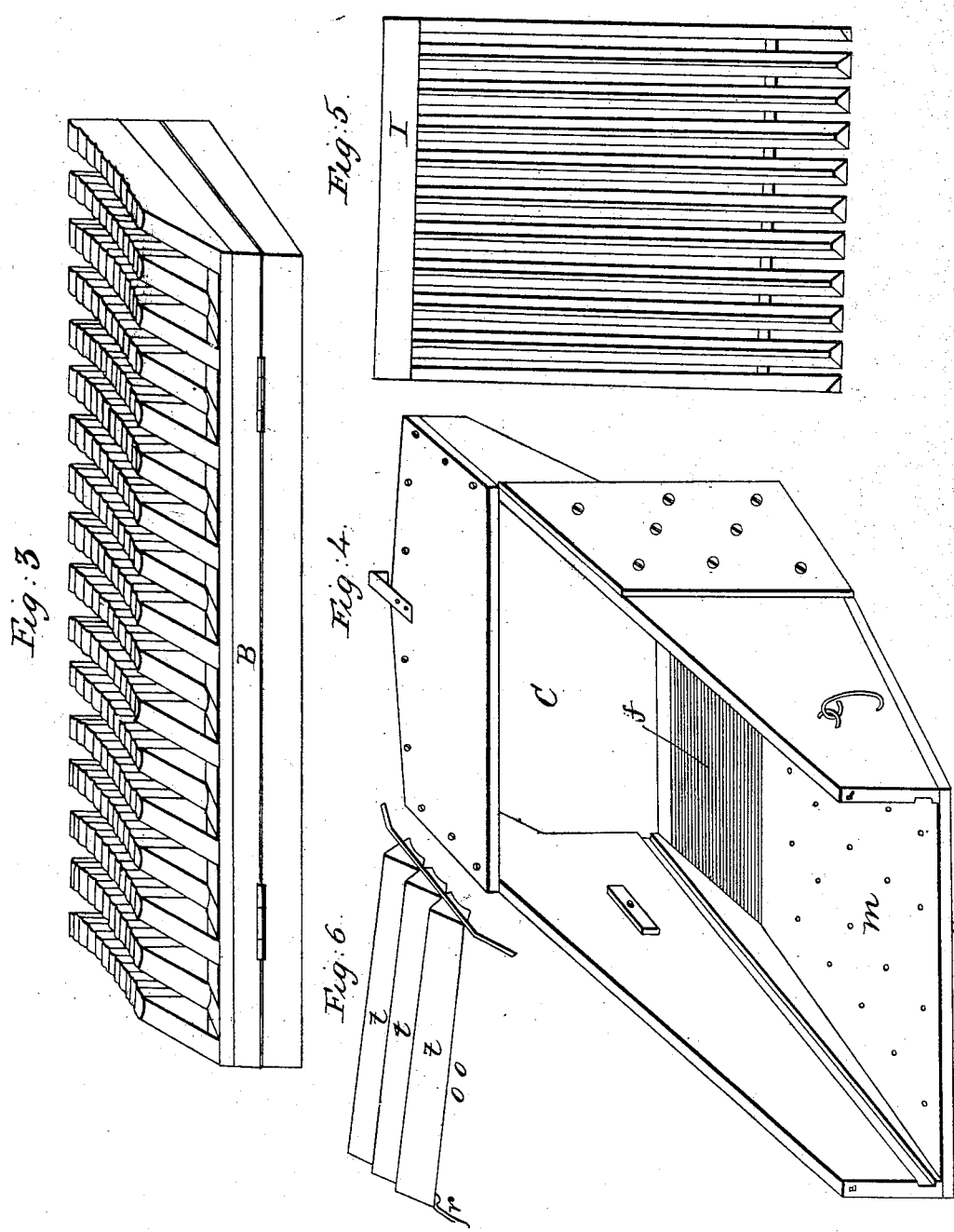

UNITED STATES PATENT OFFICE.

ADOLPH JUNGÉ, OF BELLEVILLE, ILLINOIS.

ENDLESS APRON OF THRESHING-MACHINES.

Specification of Letters Patent No. 18,455, dated October 20, 1857.

*To all whom it may concern:*

Be it known that I, ADOLPH JUNGÉ, of Belleville, in county of St. Clair and State of Illinois, have invented certain new and Useful Improvements in Threshing-Machines for Separating the Grain from the Straw; and I do hereby declare that the same are described and represented in the following specification and drawings.

To enable others skilled in the art to make and use my improvements I will proceed to describe their construction and operation, referring to the drawings, in which the same letters indicate like parts in each of the figures.

Figure 2:
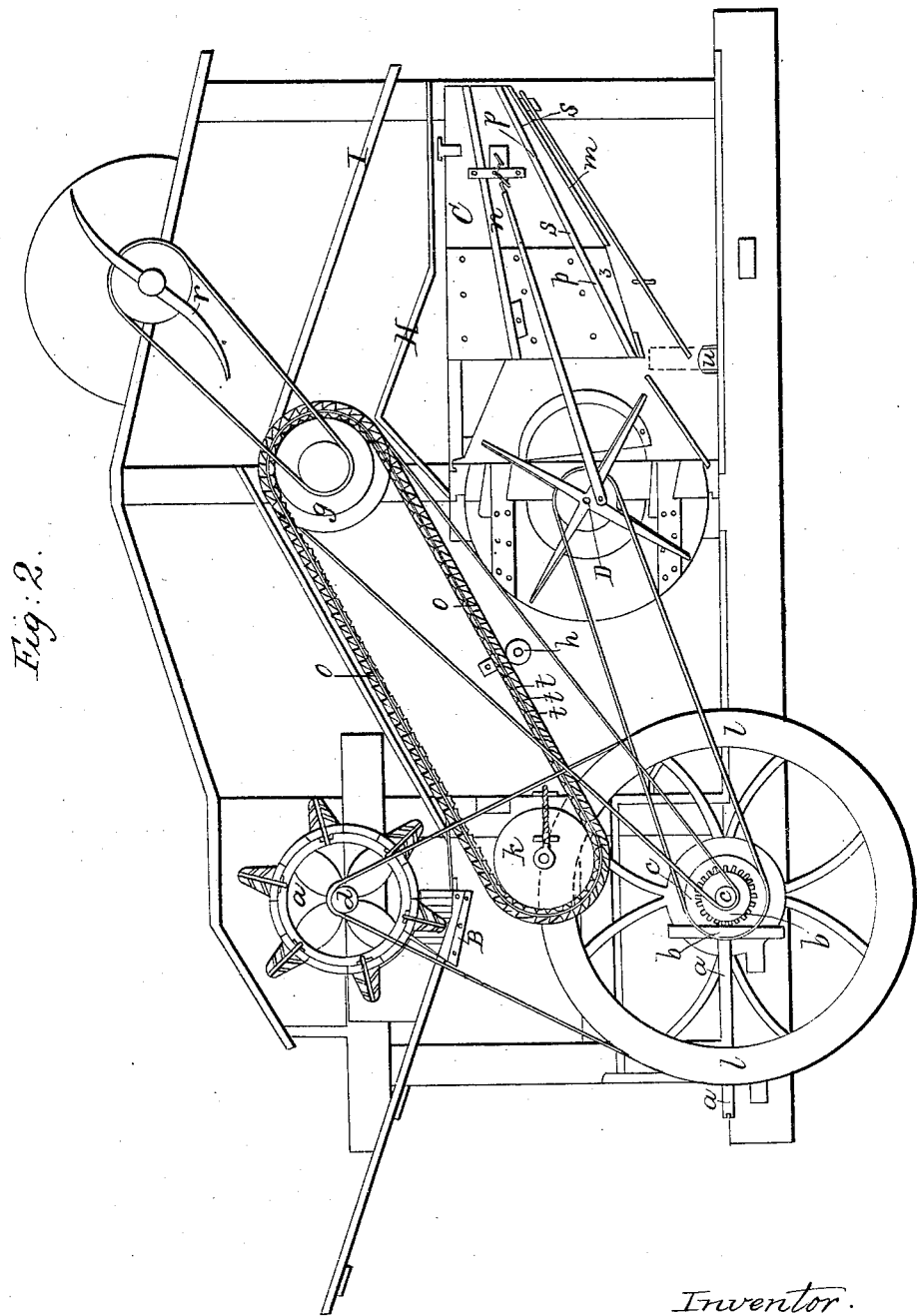

Figure 1, is a perspective view of a threshing machine with my improvements. Fig. 2, is an elevation of the machine. Fig. 3, is a view of the concave. Fig. 4, is a view of the shaker. Fig. 5, is a view of the screen arranged above the shaker. Fig. 6, is a perspective view of the grain and straw carrier.

In the accompanying drawings A A are the sills; B′, B′, the parts; and C′, C′, the top bars, which constitute the frame of the machine, and to which most of the other parts are either fastened or connected.

$a, a$, are the heads of the threshing cylinder, which are fastened to a shaft fitted to turn in boxes on the top bars C′, C′. The heads $a'$, $a'$, are connected by a series of bars $b'$, $b'$, carrying teeth $i, i, i$, grooved on each side, so as to make them work more efficiently, and reduce the weight of metal contained in them.

The pulley $x$, is fastened to the shaft of the threshing cylinder and turned by the band $f, f$, from the fly wheel $e\ e$ on the shaft $d, d$, which turns in boxes on the sills of the frame, and may be provided with a pulley or gear to which the power may be applied that is to operate the machine.

The ribbed concave B, shown in Fig. 3, is arranged under the threshing cylinder, so as to allow the teeth $i, i$, of the cylinder to pass between the ribs, which are serrated on their sides, and draw the grain and straw from the feeding board $k$, and thresh it and throw the straw and grain onto the carrier $o, o$, which is composed of slats $t, t$, made in the form shown in Fig. 6, with scores across each end for the flat bands $r, r$, which are inserted and fastened in the scores so as to form an endless band of slats passing around the pulleys $k$, and $g$, as shown in Fig. 2, which pulleys are arranged to revolve and carry the band of slats so as to deliver straw and grain on to the appropriate screens which separate the grain from the straw. By making the slats $t, t$, in the form represented in the drawing and connecting them by flat bands inserted in the ends they are carried so close together as to prevent the grain from falling through between them while at the same time they present a serrated surface which carries all the grain and straw thrown upon it with great facility. Besides by inserting the flat bands in the ends of the slats they do not come in contact with the driving pulleys and therefore are not subject to wear from the action of the pulleys, as they would be if they were put under the slats, so as to come in contact with the pulleys, hence they last much longer and are far better and far more durable in service, and further by putting the bands in the slats as described the slats can be so formed as to make an endless band of slats that will be so close as not to let the threshed grain pass through between the slats, and at the same time the corners of the slats are made with so large an angle that they are not likely to be easily split off, and therefore they are very durable and last a long time. After the band is inserted in the score a screw may be put into the slot so as to pass through the band and hold it in the score and hold the slat in its proper position on the band.

I believe I have described my improvements in threshing machines, so as to enable any person skilled in the art to make and use them. I will now state what I desire to secure by Letters Patent, to wit:

I claim—

Making the slats of the carrier $o, o$, substantially in the form shown and described, and connecting them by means of a flat band inserted in their ends, so that they will retain and carry the threshed grain, and protect the bands that connect them, from being worn by the pulleys that operate the carrier.

ADOLPH JUNGÉ.

Witnesses:
PETER MILLER,
NICOLAS ERNST.